J. R. KINNEY.
FLUID CLUTCH.
APPLICATION FILED APR. 26, 1917.

1,272,814.

Patented July 16, 1918.
2 SHEETS—SHEET 1.

Inventor:
Justus R. Kinney,
by Walter E. Lombard
Atty.

J. R. KINNEY.
FLUID CLUTCH.
APPLICATION FILED APR. 26, 1917.
1,272,814.
Patented July 16, 1918
2 SHEETS—SHEET 2.
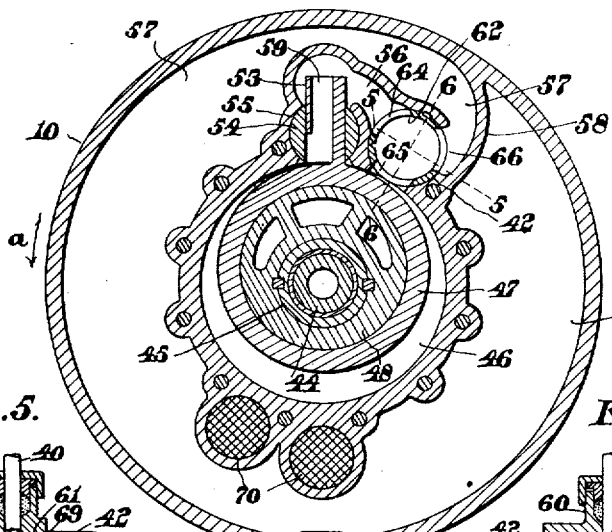
Inventor:
Justus R. Kinney,
by Walter E. Lombard,
Atty

UNITED STATES PATENT OFFICE.

JUSTUS R. KINNEY, OF ALLSTON, MASSACHUSETTS.

FLUID-CLUTCH.

1,272,814.  Specification of Letters Patent.  Patented July 16, 1918.

Original application filed November 18, 1916, Serial No. 132,477. Divided and this application filed April 26, 1917. Serial No. 165,271.

*To all whom it may concern:*

Be it known that I, JUSTUS R. KINNEY, a citizen of the United States of America, and a resident of Allston, in the county of Suffolk and Commonwealth of Massachusetts, have invented certain new and useful Improvements in Fluid-Clutches, of which the following is a specification.

This invention relates to fluid clutches and particularly to devices of this class which are adapted to be used in connection with the power transmission mechanism of motor cars to transmit motion gradually from the engine to the driving mechanism whereby varying speeds may be obtained through the medium of a confined body of fluid.

The present invention is a division of the application filed by me Nov. 18, 1916, and numbered 132,477.

The invention consists in means for controlling the flow of the fluid in its casing, for the purpose of varying the speed of the driven member during the rotary movement of the driving member, or to permit the free circulation of the fluid in the casing so that no power is transmitted from one member to the other.

The invention consists further in certain novel features of construction and arrangement of parts which will be fully understood by reference to the description of the drawings and to the claims hereinafter given.

For the purpose of illustrating the invention one preferred form thereof is illustrated in the drawings, this form having been found to give satisfactory and reliable results, although it is to be understood that the various instrumentalities of which the invention consists can be variously arranged and organized, and that the invention is not limited to the precise arrangement and organization of these instrumentalities as herein shown and described.

Of the drawings:

Fig. 3 represents a vertical transverse section on line 3—3 on Fig. 1.

Fig. 4 represents a vertical transverse section on line 4—4 on Fig. 1.

Fig. 5 represents a sectional detail of the sliding valve mechanism on line 5—5 on Fig. 3, and Fig. 6 represents a sectional detail of the sliding valve on line 6—6 on Fig. 3.

Similar characters designate like parts throughout the several figures of the drawings.

Figure 1:
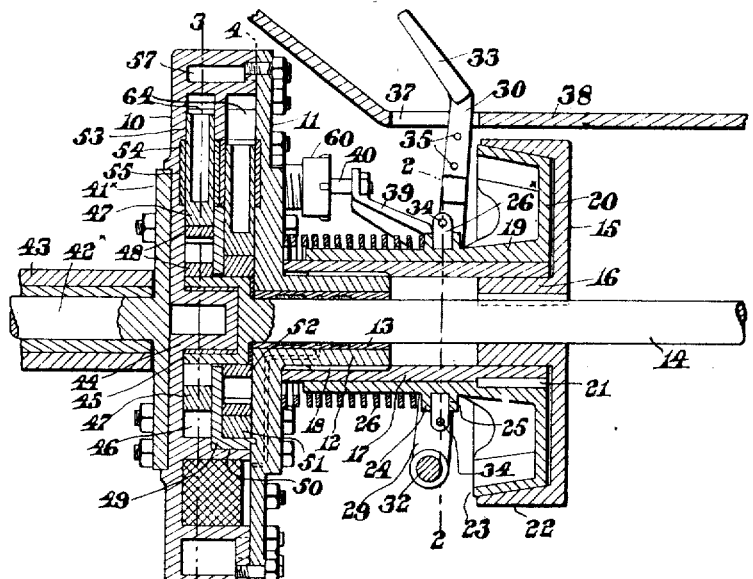
Figure 1 represents a central longitudinal section of a device embodying the principles of the present invention.

In the drawings, 10 represents a casing member having secured to one end a cover plate 11 provided with an outwardly extending hub 12, having therein a bearing 13 for the end of a revoluble shaft 14, to which is secured one part 15 of a clutch.

The part 15 is provided with a hub 16 and on this hub 16 and the hub 12 is mounted a sleeve 17, said sleeve being keyed to the hub 12, as indicated at 18. The sleeve 17 is surrounded by the hub 19 of a movable part 20 of said clutch, said part 20 being keyed to the sleeve 17 at 21 so as to revolve therewith, while at the same time it is adapted to be moved longitudinally thereof to permit the two parts 15—20 of the clutch to be engaged and disengaged as desired.

The part 15 is provided with an annular flange 22, the inner face of which is inclined to correspond to and coact with the cone-shaped flange 23 of the part 20. The hub 19 is also provided with an annular flange 24 having an annular groove 25 therein.

Between the flange 24 and the cover plate 11 and surrounding the hub 19 is a helical spring 26 which is adapted to normally retain the cone-shaped flange 23 of the part 20 in contact with the flange 22 of the part 15, thereby locking the two parts together and preventing rotary movement of either independently of the other.

In the groove 25 is disposed a ring 26ˣ provided with diametral outwardly extending trunnions 27 extending through slots 28 in the parallel arms 29 of a pivoted lever 30, the lower ends of which are secured at 31 to an oscillating shaft 32 disposed in any suitable bearings.

The upper end of the lever 30 is provided with a treadle pad 33 by which the part 20 may be disengaged from the part 15 of the clutch when it is desired to permit rotary movement of one part relatively to the other.

Figure 2:
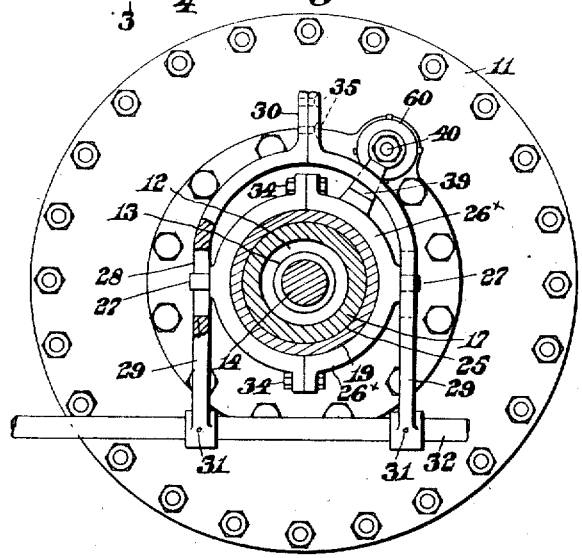
Fig. 2 represents a vertical transverse section on line 2—2 on Fig. 1.

The ring 26* is preferably made in two parts connected together at 34 as indicated in Figs. 1 and 2. The lever 30 is also preferably made in two parts connected together at 35 as shown in said Figs. 1 and 2. The lever 30 extends upwardly through a slot 37 in the floor 38 of the car so that the treadle 33 is above said floor 38 in position to be actuated by the foot of the operator.

The hub 19 of the part 20 is provided with a radial arm 39, the outer end of which is connected to the stem 40 of the valve 41 positioned in a cylindrical depression 42 extending transversely of the casing 10.

The casing 10 has secured to its outer face a flange formed upon or secured to the driving or engine shaft 42* which is revolubly mounted in a bearing 43. The casing 10 is provided with a central projection 44 on its inner face, said projection being surrounded by a cylindrical flange 45 formed upon the inner end of the driven shaft 14, all as shown in Fig. 1.

The casing 10 is provided with a central cylindrical chamber 46 in which is disposed an annular piston member 47 surrounding an eccentric 48 keyed to the flange 45 of the driven shaft 14.

Set into the casing 10 is a cup-shaped member 49 forming another cylindrical chamber 50 in which is disposed another annular piston member 51 surrounding another eccentric 52 also keyed to the flange 45 of the driven shaft 14.

The eccentrics 48 and 52 are disposed diametrically opposite each other.

While only two chambers 46 and 50 are shown in the drawings, it is obvious a greater number may be used in which case the eccentrics therein should be equally spaced about the axis of the shaft 14.

Each piston member 47 and 51 is provided with a radial blade 53 each extending through a diametral slot in a cylindrical oscillating member 54. These slotted oscillating members 54 are disposed in alinement in the cylindrical depression 55 formed in the casing 10. The depression 55 communicates with the cylindrical chambers 46 and 50 and also communicates by two passages 56 with the depression 42.

This depression 42 also communicates with the chambers 46 and 50 and with one end of a connecting passage 57 partially surrounding the cylindrical chambers 46 and 50.

The opposite end of said connecting passage is closed by the wall or abutment 58. The piston blades 53 are each provided with fluid passages 59 extending from the outer ends thereof, the inner ends of said passages communicating with the cylindrical chambers 46 and 50.

In the depression 42 is the cup-shaped valve 41, one end of which is provided with the stem 40 extending through a stuffing box 60. The end of the valve 41 nearest said stem 40 is provided with a plurality of openings 61 through which the fluid is adapted to pass as the valve is reciprocated in the depression 42.

The depression 42 is provided with a cylindrical lining 62 prevented from rotating by the key 63. This lining is provided with three sets of ports 64, 65, and 66.

The ports 64 communicate with the passages 56, the ports 65 with the cylindrical chambers 46 and 50, while the ports 66 communicate with the end of the connecting passage 57. The tubular portion of the valve 41 is also provided with three sets of ports 67, 68, and 69, coacting respectively with the ports 64, 65, and 66.

The ports 69 are arranged to be always in communication with the ports 66 regardless of the position of the valve 41. The ports 68 are also arranged to be in communication at all times with the ports 65, although in the movement of the valve 41 these ports 65 and 66 may be partially closed.

In order to balance the casing 10, chambers 70 are formed therein diametrically opposite the depressions 42—55, and these chambers are filled with material of sufficient weight to balance the weight of the parts opposite thereto. The rotation of the casing 10 is in the direction indicated by the arrow on Fig. 3 of the drawings.

The normal working position of the valve 41 is that shown in Figs. 5 and 6, with the ports 64 closed, and when in this position all circulation of fluid in the chambers 46 and 50 is prevented, thereby causing the driven shaft 14 to be rotated at the same or substantially the same speed as the engine shaft and in the same direction therewith.

When it is desired to start the car, the operator depresses the treadle 33, thus disengaging the clutch parts 15 and 20 and moving simultaneously the sliding valve 41 so that the ports 64 are fully opened. The fluid will then be free to circulate from the chambers 46—50 through the passages 59 and 56 and recess 42 and also through the connecting passage 57, and no movement will be imparted to the driven shaft 14 by the driving or engine shaft 42* when the engine has been started.

If the operator gradually permits the treadle lever to return to its normal position, the circulation of the fluid in the casing will be gradually retarded and consequently the speed of the driven shaft will be increased proportionately until by the action of the spring 26 the sliding part 20 has been moved into gripping contact with the other part 15 thereof and the clutch members securely locked together.

It is obvious that at any one time while the engine is running the speed of the driven member may be changed at will by simply actuating the treadle 33 and partially closing the ports 64, thus gradually building up a pressure in the chambers 46 and 50.

When the casing 10 is moved in the direction indicated by the arrow *a* on Fig. 3 of the drawings, the oil in the connecting passage 57 will be forced in the opposite direction, and through the ports 66—69 and ports 65—68 into the chambers 46—50, thus keeping these chambers completely filled with fluid at all times and under all conditions.

When the ports 64—67 are open the fluid is permitted to freely pass from the chambers 46—50 through the passages 59 into the valve 41, from which said fluid may pass into the chambers 46—50 through the ports 65—68 or into the connecting passage 57 through the ports 66—69.

When the device is in operation, the discharge ports 64—67 are closed and the foot is off the treadle. At this time there is a clear passage through the valve 41 from the passage 57 to the chambers 46—50.

When it is desired to stop a car to which said device is attached, the treadle 33 is depressed, thereby opening the discharge ports 64—67 and permitting the pressure in the chambers 46—50 to be released. While the ports 64—67 are being opened, the ports 65—68 are being partially closed, thus gradually shutting off the supply of oil to the chambers 46—50, and thus permitting the fluid clutch to idle more easily.

At the beginning of the inward movement of the valves 41 the clutch member 23 is removed from contact with the member 22, and these two members are free from contact when the ports 64—67 begin to open.

By means of this device any required speed may be attained and the speed varied at will or all power disconnected from the driven shaft.

This makes a very effective fluid clutch particularly adapted to be used in connection with power transmission devices for motor cars.

It is believed that the operation and many advantages of this invention will be fully understood from the foregoing description.

Having thus described my invention, I claim:

1. In a device of the class described, the combination with driving and driven members, of a cylindrical casing on one of said members having a cylindrical central chamber partially surrounded by a connecting passage communicating therewith at one end by two communicating passages, said chamber and connecting passage both containing fluid; an eccentric piston in said chamber secured to the other member and provided with a radial blade having a fluid passage therein communicating with said chamber; an oscillating member in one communicating passage provided with a diametral slot therein through which said blade extends; and a valve in the other communicating passage adapted to control the flow of fluid between said chamber and connecting passage.

2. In a device of the class described, the combination with driving and driven members, of a cylindrical casing on one of said members having a cylindrical central chamber partially surrounded by a connecting passage communicating therewith at one end by two communicating passages, said chamber and connecting passage both containing fluid; an eccentric piston in said chamber secured to the other member and provided with a radial blade having a fluid passage therein communicating with said chamber; an oscillating member in one communicating passage provided with a diametral slot therein through which said blade extends; and a slidable valve in the other communicating passage adapted to control the flow of fluid between said chamber and connecting passage.

3. In a device of the class described, the combination with driving and driven members, of a cylindrical casing on one of said members having a cylindrical central chamber partially surrounded by a connecting passage communicating at one end by two communicating passages, said chamber and connecting passage both containing fluid; an eccentric piston in said chamber secured to the other member and provided with a radial blade having a fluid passage therein communicating with said chamber; an oscillating member in one communicating passage provided with a diametral slot therein through which said blade extends; a slidable valve in the other communicating passage adapted to control the flow of fluid between said chamber and connecting passage; and treadle controlled means for imparting a sliding movement to said valve.

4. In a device of the class described, the combination with driving and driven members, of a cylindrical casing on one of said members having a cylindrical central chamber partially surrounded by a connecting passage communicating at one end by two communicating passages, said chamber and connecting passage both containing fluid; an eccentric piston in said chamber secured to the other member and provided with a radial blade having a fluid passage therein communicating with said chamber; an oscillating member in one communicating passage provided with a diametral slot therein through which said blade extends; and a slidable valve in the other communicating passage adapted to control the flow of fluid between said chamber and connecting passage, said valve having two sets of ports, one set of which communicates with the passage to the fluid passage in said radial blade while the other set is adapted to communicate with ports into said chamber.

5. In a device of the class described, the combination with driving and driven members, of a cylindrical casing on one of said members having a cylindrical central chamber partially surrounded by a connecting passage communicating at one end by two communicating passages, said chamber and connecting passage both containing fluid; an eccentric piston in said chamber secured to the other member and provided with a radial blade having a fluid passage therein communicating with said chamber; an oscillating member in one communicating passage provided with a diametral slot therein through which said blade extends; and a cup-shaped valve in the other communicating passage adapted to control the flow of fluid between said chamber and connecting passage.

6. In a device of the class described, the combination with driving and driven members, of a cylindrical casing on one of said members having a cylindrical central chamber partially surrounded by a connecting passage communicating therewith at one end by two communicating passages, said chamber and connecting passage both containing fluid; an eccentric piston in said chamber secured to the other member and provided with a radial blade having a fluid passage therein communicating with said chamber; an oscillating member in one communicating passage provided with a diametral slot therein through which said blade extends; and a cup-shaped valve in the other communicating passage adapted to control the flow of fluid between said chamber and connecting passage, said valve having a plurality of openings in the end thereof.

7. In a device of the class described, the combination with revoluble driving and driven members, of a cylindrical casing on one of said members having a cylindrical central chamber partially surrounded by a connecting passage and both containing fluid, the ends of said connecting passage being separated by an abutment provided with two transverse cylindrical depressions both communicating with each other and with said central chamber, and one also communicating with an end of said connecting passage; a slotted oscillating member in the first mentioned depression; a rotary eccentric piston in the central chamber provided with a radial blade extending through the slot in said oscillating member and having a fluid passage therein communicating with said chamber, said piston being secured to the other revoluble member; a valve member in the other depression having ports adapted to control the flow of fluid between said central chamber and connecting passage; and means for controlling the operation of the fluid controlling member.

8. In a device of the class described, the combination with revoluble driving and driven members, of a cylindrical casing on one of said members having a cylindrical central chamber partially surrounded by a connecting passage and both containing fluid, the ends of said connecting passage being separated by an abutment provided with two transverse cylindrical depressions, both communicating with each other and with said central chamber, and one also communicating with an end of said connecting passage; a slotted oscillating member in the first mentioned depression; a rotary eccentric piston in the central chamber provided with a radial blade extending through the slot in said oscillating member and having a fluid passage therein communicating with said chamber, said piston being secured to the other revoluble member; a tubular valve member in the other depression having ports adapted to control the flow of fluid between said central chamber and connecting passage; and means for controlling the operation of the fluid controlling member.

9. In a device of the class described, the combination with revoluble driving and driven members, of a cylindrical casing on one of said members having a cylindrical central chamber partially surrounded by a connecting passage and both containing fluid, the ends of said connecting passage being separated by an abutment provided with two transverse cylindrical depressions both communicating with each other and with said central chamber, and one also communicating with an end of said connecting passage; a slotted oscillating member in the first mentioned depression; a rotary eccentric piston in the central chamber provided with a radial blade extending through the slot in said oscillating member and having a fluid passage therein communicating with said chamber, said piston being secured to the other revoluble member; a valve member in the other depression having three sets of ports adapted to control the flow of fluid between said central chamber and connecting passage, the set of ports to said connecting passage being always open while the other sets of ports are adapted to shut off communication with the first mentioned depression and with the central chamber; and means for controlling the operation of the fluid controlling member.

10. In a device of the class described, the combination with revoluble driving and driven members, of a cylindrical casing on one of said members having two separated cylindrical chambers, centrally disposed, both partially surrounded by a connecting passage, both said passage and chambers containing fluid, and the ends of said connecting passage being separated by an abutment provided with two transverse cylindrical depressions, both communicating with each other and with said central chambers, and one also communicating with the opposite end of said connecting passage; two slotted oscillating members positioned end to end in the first mentioned depression; a rotary eccentric piston in each central chamber provided with a radial blade extending through the slot in an oscillating member and having a fluid passage therethrough communicating with said chamber, said piston being secured to the other revoluble member; a ported valve in the other depression adapted to control the flow of fluid between said central chambers and connecting passage; and means for controlling the operation of said fluid controlling member.

11. In a device of the class described, the combination with revoluble driving and driven members, of a cylindrical casing on one of said members having two separated cylindrical chambers, centrally disposed, both partially surrounded by a connecting passage, both said passage and chambers containing fluid, and the ends of said connecting passage being separated by an abutment provided with two transverse cylindrical depressions, both communicating with each other and with said central chambers, and one also communicating with the opposite end of said connecting passage; two slotted oscillating members positioned end to end in the first mentioned depression; a rotary eccentric piston in each central chamber provided with a radial blade extending through the slot in an oscillating member, and having a fluid passage therethrough communicating with said cylindrical chamber, said piston being secured to the other revoluble member; a reciprocating ported valve in the other depression adapted to control the flow of fluid between said central chambers and connecting passage; and means for controlling the operation of said fluid controlling valve.

Signed by me at Boston, Mass., this 18th day of April, 1917.

JUSTUS R. KINNEY.

Witnesses:
WALTER E. LOMBARD,
NATHAN C. LOMBARD.